United States Patent
Pan

(10) Patent No.: US 7,361,426 B2
(45) Date of Patent: Apr. 22, 2008

(54) SURFACE STRUCTURE FOR ENHANCING CATALYST REACTIVITY AND METHOD OF MANUFACTURING THEREOF

(75) Inventor: Alfred I-Tsung Pan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 299 days.

(21) Appl. No.: 10/118,928

(22) Filed: Apr. 10, 2002

(65) Prior Publication Data

US 2003/0194600 A1    Oct. 16, 2003

(51) Int. Cl.
*H01M 4/04*    (2006.01)

(52) U.S. Cl. .................. 429/41; 429/218.1; 29/2; 29/623.5

(58) Field of Classification Search ............ 502/2, 502/5, 101, 527.6; 429/40, 41, 218; 29/2, 29/623.5
See application file for complete search history.

(56) References Cited

U.S. PATENT DOCUMENTS

| | | | |
|---|---|---|---|
| 4,182,796 A * | 1/1980 | Heller et al. ............ | 429/111 |
| 4,427,749 A * | 1/1984 | Graetzel et al. .......... | 429/111 |
| 5,612,560 A * | 3/1997 | Chivukula et al. ........ | 257/309 |
| 6,326,097 B1 | 12/2001 | Hockaday | |

FOREIGN PATENT DOCUMENTS

JP        2000005606 A  *  1/2000

OTHER PUBLICATIONS

Kim et al., "Microstructure of thermal hillocks on blanket Al thin films", Thin Solid Films, 371 (2000) 278-282.*
Iwamura et al., "Effect of aluminum oxide caps on hillock formation in aluminum alloy films", thin Solid Films, 349, (1999), 191-198.*
Electrochemistry Encyclopedia, "Electrochemical capacitors," (http://electrochem.cwru.edu/ed/encycl/), Mar. 2003.*
Intrinsic Stress Dependence of PT Hillock Formation and its related Electrical Properties of SBT Capacitor Integrated Ferroelectrics, New York, NY US, vol. 25, No. 1, Mar. 7, 1999 pp. 299-309 XP009014487.
Summerfelt, Scott R et al: Pt hillock formation and decay Proceedings of the 1994 MRS Fall Meeting: Boston, MA USA Nov. 29-Dec. 2, 1994 vol. 361 Nov. 29, 1994 pp. 257-262 XP009014485.

(Continued)

Primary Examiner—Mark Ruthkosky

(57) ABSTRACT

A method of enhancing catalyst reactivity includes (1) depositing a conductive oxide on a suitable substrate, (2) depositing a thin film of catalyst on top of the conductive oxide to form a sandwich structure, and (3) annealing the structure at a, suitable temperature so that the thin film of catalyst forms nano structure hillocks that enhance the catalyst reactivity. An improved fuel cell may use an anode or cathode, or both, formed according to the above method. Such an anode or cathode will include a catalyst nano hillock structure formed on top of a conductive material layer.

38 Claims, 6 Drawing Sheets

OTHER PUBLICATIONS

Lee Jeong Soo et al: Microstructural characterization of PT/TI and RuO2 electrodes on SiO2/Si annealed in the oxygen ambient Proceedings of the 1996 MRS Spring Symposium, San Francisco, CA USA col. 433, 1996 XP009014486 pp. 175-180.

Database Compendex Online Engineering Information, Inc., NY, NY USA: Baldelli Steve et al: Surface enhanced sum frequency generation of carbon monoxide adsorbed on platinum nanoparticle arrays Database accession No. E2000525408621 XP002250624.

Baldelli Steve et al: Surface enhanced sum frequency generation of carbon monoxide adsorbed on platinum nanoparticle arrays Journal of Chem. Physcis Oct. 2000 American Inst of Physics, Woodbury, NY, USA vol. 113 No. 13 XP002250623.

Baldelli, S.,et al. "Surface enhanced sum frequency generation of carbon monoxide adsorbed on platinum nanoparticle arrays," Journal of Chemical Physics, 113:5432-8, Jul. 6, 2000.

"Pt Hillock Formation and Decay," by Summerfelt, S.R. et al. in "Ferroelectric Thin Films IV" Tuttle, B. A. et al., eds., Materials Research Society Symp. Proc., 361: 257-262, 1995.

* cited by examiner

SURFACE STRUCTURE FOR ENHANCING CATALYST REACTIVITY AND METHOD OF MANUFACTURING THEREOF

TECHNICAL FIELD

The technical field relates to surface structures that enhance catalyst reactivity, and in particular, to catalyst-coated oxide substrate with hillock structures. The catalyst-coated oxide substrate may be used in electrochemical devices, including fuel cells, batteries, sensors, electrolyzers and the like.

BACKGROUND

A desirable feature for electrochemical systems employing a catalysis process, such as fuel cells, batteries, sensors, and electrolyzers, is the ability to deliver the highest catalyst reactivity within the size and weight limit of the system. In typical fuel cells employing liquid fuel, such as methanol, and an oxygen-containing oxidant, such as air or pure oxygen, the methanol is oxidized at an anode catalyst layer to produce protons and carbon dioxide. The protons migrate through an electrolyte from the anode to a cathode. At a cathode catalyst layer, oxygen reacts with the protons to form water. The anode and cathode reactions in this type of direct methanol fuel cell are shown in the following equations:

I:

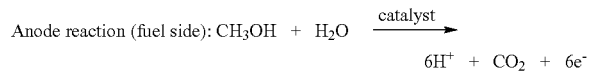

Anode reaction (fuel side): $CH_3OH + H_2O \xrightarrow{catalyst} 6H^+ + CO_2 + 6e^-$

II:

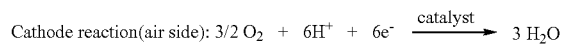

Cathode reaction (air side): $3/2\, O_2 + 6H^+ + 6e^- \xrightarrow{catalyst} 3\, H_2O$

Net reaction: $CH_3OH + 3/2\, O_2 \rightarrow 2H_2O + CO_2$   III

The energy efficiency of the fuel cell is determined by the rate of oxidation and reduction reactions that require catalysts in order to proceed. An increased catalyst reactivity will result in an increase in the number of reactions per unit time at the electrodes and, therefore, higher energy efficiencies for the fuel cell.

The catalyst reactivity in an electrochemical system can be enhanced by (1) utilizing a catalytic material that has a high catalytic activity and electrical conductivity, and is stable under a wide range of operating conditions; and (2) increasing the contact area between the reactants and the catalyst.

New catalytic materials are being developed constantly to improve the efficiency of electrochemical systems. For example, in the field of fuel cells, platinum (Pt) has long been acknowledged as the best anode catalyst for hydrogen. However, while Pt catalysts have demonstrated high activity for hydrogen oxidation, this proclivity for facile kinetics is severely retarded with carbon monoxide (CO) concentrations of only a few ppm. Therefore, CO tolerant electrocatalyst such as platinum ruthenium bimetallic alloy (Pt:Ru) was developed. It was recently discovered that platinum molybdenum bimetallic alloy (Pt:Mo) may function as a CO tolerant catalyst superior to Pt:Ru (B. N. Grgur et al.; Journal of Physical Chemistry (B), vol. 101, no. 20, 1997, p. 3910).

The development of methods to increase surface area is also critical to the improvement of technologies dependant on catalytic reaction. In the field of fuel cells, attempts have been made to use electrodes made of an electrically conductive porous substrate that renders the electrode permeable to fluid reactants and products in the fuel cell. To increase the surface area for reaction, the catalyst can be filled into or deposited onto the porous substrate.

These modifications, however, result in a fragile porous electrode that needs additional mechanical support. An alternative is to sinter a porous coating on a solid substrate and then fill or re-coat the porous coating with a catalyst. The sintering process, however, is a multiple step procedure that requires baking at high temperatures.

In U.S. Pat. No. 6,326,097 to Hockaday, a surface replica technique is used to form an "egg-crate" texture on a membrane in a micro-fuel cell. The catalyst and metal electrode are applied to the surface of the membrane, and then the membrane is etched away so that the catalyst and electrode surfaces replicate that texture. This procedure is complicated, requiring blind etching and many separate operations.

Thus, there remains a need to develop more efficient catalytic systems for electrochemical applications.

SUMMARY

A method of enhancing catalyst reactivity by (1) depositing a conductive oxide substrate on an electrode material, (2) depositing a thin film of catalyst on top of the conductive oxide, and (3) annealing the catalyst at a suitable temperature so that the thin film of catalyst forms nano structure hillocks. The hillock structure enhances the catalyst reactivity due to the presence of the interface between the catalyst and the oxide substrate.

In another embodiment, the electrode material is first covered with a conductive metal or alloy before the deposition of the conductive oxide. The conductive metal or alloy enhances the overall conductance of the structure because it facilitates the proton/electron movement from the conductive oxide to the electrode material.

In another embodiment, the electrode material is first covered with a layer of a non-oxide, metal based conductive material that would not react with the catalyst at annealing temperature, followed with a thin layer of catalyst. The catalyst is annealed to form nano structure hillocks. The hillock structure is then subjected to an oxidization process at an elevated temperature (e.g. 300-400° C.) or an anodizing process to convert the surface of the exposed non-oxide, metal based conductive material into corresponding metal oxide.

In yet another embodiment, a fuel cell is manufactured using electrodes comprising a catalytic system with a hillock structure.

Additional advantages and novel features will be set forth in part in the description which follows, and in part will become apparent to those skilled in the art upon examination of the following or may be learned by practice of the invention.

BRIEF DESCRIPTION OF THE DRAWINGS

The detailed description will refer to the following drawings, in which like numerals refer to like elements, and in which.

DETAILED DESCRIPTION

Figure 1:
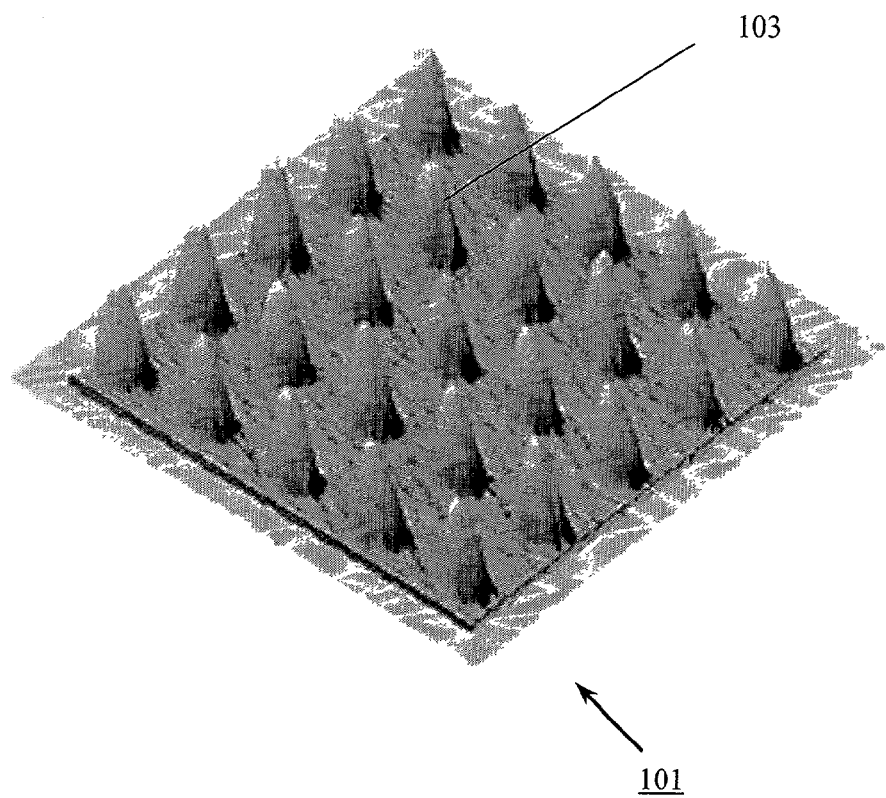
FIG. 1 depicts an image of a Pt nanoparticle array.

There is ample evidence to show that electrocatalysts can differ in their activity due to preparation methods. For example, a Pt:Ru alloy prepared by sputtering a bulk alloy, annealing a bulk alloy, or depositing a submonolayer of Ru on Pt all yield fundamentally different catalytic properties. Recently, Baldelli, S. et al. reported that Pt nanoparticle arrays showed significantly enhanced catalytic reactivity compared to Pt thin film (Baldelli, S.,et al. "Surface enhanced sum frequency generation of carbon monoxide adsorbed on platinum nanoparticle arrays," Journal of Chemical Physics, 113:5432-8, 2000). FIG. 1 shows an image of Pt nanoparticle array 101 where particles 103 have a diameter of 40 nm and are spaced 150 mn from each other (Supra). The Pt nanoparticle array 101 is fabricated using electron beam lithography (Supra). Briefly, a Si (100) wafer with 5 nm thick $SiO_2$ on the surface is spin-coated with a layer of photoresist polymethyl methacryllate (PMMA, MW 950,000). Computer-designed patterns are then "written" into the photoresist layer with a highly collimated electron beam generated by a field emission source. The exposed photoresist is dissolved and a 15 nm thick film of Pt is deposited on the Si (100) wafer by electron beam evaporation. Finally, the remaining photoresist is removed by dissolution with organic solvent and the metal particles of the prescribed pattern remained on the Si (100) wafer (Supra). Using sum frequency generation (SFG) vibrational spectroscopy, Baldelli et al. found that the SFG signal of CO adsorbed to the Pt particles exhibited a significant enhancement compared to CO adsorbed on a smooth Pt film. The enhanced reactivity of Pt is attributed to the presence of the interface between Pt and the oxide substrate in the Pt nanoparticle array 101. The elaborated electron beam lithography and subsequent photolithography, however, would be difficult to perform on a porous substrate.

Figure 2:
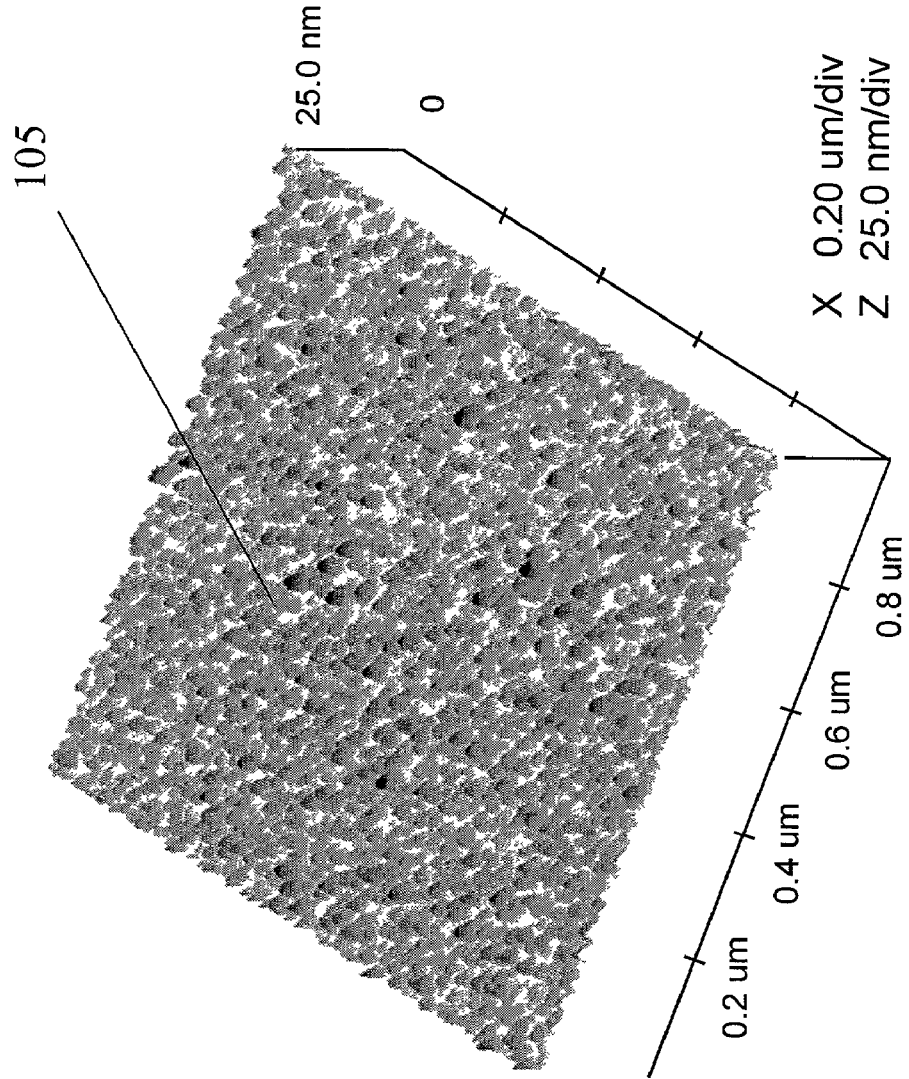
FIG. 2 depicts an image of Pt nano hillocks formed on a $SiO_2$ substrate after annealing at a high temperature.

According to the present invention, a catalyst film hillock structure similar to the Pt nanoparticle array 101 described above is generated by annealing a thin catalyst film at high temperatures to a suitable substrate. In an embodiment, a thin layer of Pt catalyst is deposited onto the surface of a substrate, such as $SiO_2$, using electron beam evaporation. The catalyst layer is then annealed to the substrate at a high temperature. During the annealing process, a compressive stress builds up in the catalyst film plane as temperature rises. When the compressive stress exceeds the buckling point of the catalyst film, the film relieves the stress by pushing a portion of the film out of the plane to form a hillock ("Pt Hillock Formation and Decay," by Summerfelt, S. R. et al. in "Ferroelectric Thin Films IV" Tuttle, B. A. et al., eds., *Materials Research Society Symp. Proc.*, 361:257-26, 1995). This technique makes it possible to produce hillock structure on non-flat surfaces, such as on the surfaces of porous particles, without the need of photolithography. FIG. 2 shows an image of Pt hillock structure 105 formed on a $SiO_2$ substrate after annealing at a temperature of 800-900° C. for 30 to 60 minutes.

In fuel cell applications, the substrate for the hillock catalyst structure 105 is a conductive material so that the electrons/protons generated on the catalytic surface can be collected by an electrode. In one embodiment, the substrate is conductive oxygen deficient silicon oxide. Conductive oxygen deficient silicon oxide is a silicon oxide that is stoichiometrically deficient for oxygen. While normal silicon oxide is represented by the formula $SiO_2$, the oxygen deficient silicon oxide is represented by the formula $SiO_x$, where x is greater than zero but smaller than 2. $SiO_x$ is conductive because the oxygen deficiency provides conduction paths for electrons. Generally, good conductivity is obtained when x is smaller than 1.7. $SiO_x$ can be produced by reactive sputtering from a silicon target in an oxygen environment. Other conductive oxides, such as $RuO_2$, $ZnO_2$, $SnO_2$ ZnInO and SrRuO, are also suitable substrates for the hillock structure 105.

Figure 3:
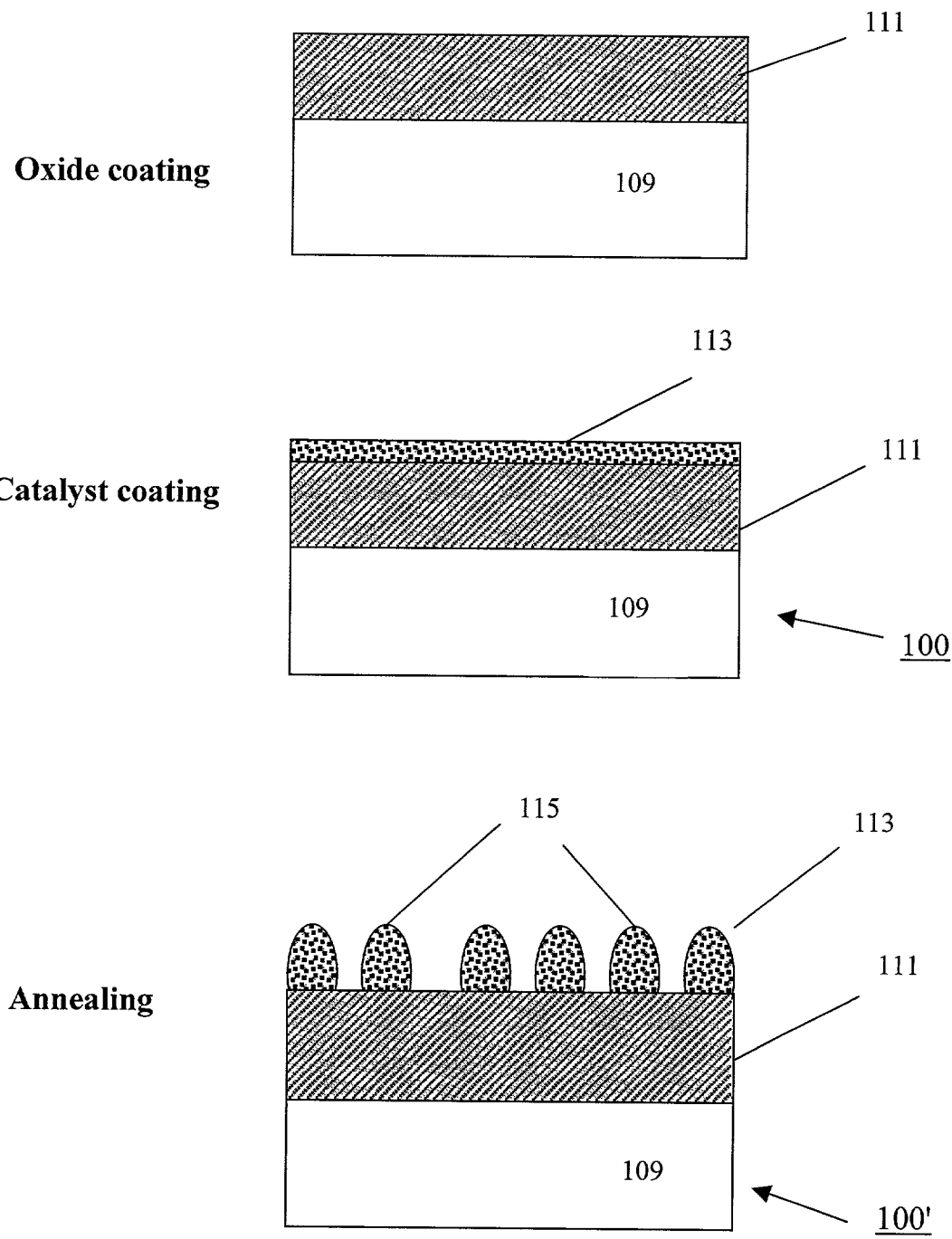
FIG. 3 depicts a process flow for producing a hillock catalytic structure.

FIG. 3 depicts a process of producing a catalyst hillock structure for use in a fuel cell application. In this embodiment, an oxide 111 is deposited on an electrode material 109. The electrode material can be any conductive material. In one embodiment, the electrode material 109 is a porous conductive material, such as sintered metal, metal ceramics, or carbon composite. The oxide 111 can be conductive or semi-conductive. Examples of the oxide 111 include, but are not limited to, $SiO_x$, $RuO_2$, $ZnO_2$, $SnO_2$, ZnInO and SrRuO. The thickness of the oxide layer is in the range of 10 nm -100 nm, preferably 15 nm -40 nm, and in one embodiment is 20 nm. In the case of $SiO_x$, the oxide deposition is carried out in the presence of excited oxygen generated by plasma (such as an oxygen atom, an oxygen atom in an excited state, an oxygen molecule in an excited state), and a silicon sputtering target. By controlling an oxygen/argon flow ratio and the power to the target such that oxygen is provided at a less than stoichiometrical amount during the deposition, a conductive silicon oxide film that is stoichiometrically deficient of oxygen ($SIO_x$) is obtained.

A thin film of a catalyst 113 is then deposited onto the oxide 111 to form a sandwich structure 100. The catalyst 113 may be any catalyst suitable for fuel cell applications, including but are not limited to, any noble metal catalyst system. As is known in the art, such catalyst systems comprise one or more noble metals, which may also be used in combination with non-noble metals. In one embodiment, the noble metal material comprises an alloy of Pt and Ru. In another embodiment, the catalyst systems comprise alloys of Pt:Mo, Pt:Sn, and Pt:Ru:Os. Other noble metal catalytic systems known and available to those of skill in the art may be similarly employed in the present invention.

The catalyst 113 may be deposited onto the oxide 111 by electron beam evaporation, sputtering, atomic layer deposition, chemical vapor deposition or any other suitable surface coating methods.

The catalyst 113 is then annealed at high temperatures to produce hillocks 115 in the presence of air, oxygen, hydrogen, argon, helium, or a mixture thereof. The annealing condition (temperature, time, and environment) can vary depending on the material and particle size of catalyst 113, oxide 111 and electrode material 109, as well as the thickness of the catalyst and oxide layer. On one hand, the hillocks 115 form only when the compressive stress resulted from heating exceeds the buckling point of the catalyst film 113. On the other hand, elevated annealing temperatures and/or prolonged annealing period may result in hillock decay since the hillocks 115, once formed, tend to reduce their surface energy which is larger than what is normal because of the large surface area-to volume ratio of the hillock structure. Therefore, optimal conditions for hillock formation need to be determined based on the specific catalyst/oxide/substrate combination. Generally, higher annealing temperature and/or thinner oxide layer will result in smaller hillocks. A more detailed description about Pt hillock formation and decay may be found in "Pt Hillock Formation and Decay," by Summerfelt, S. R. et al. in "Ferroelectric Thin Films IV" Tuttle, B. A. et al., eds., *Materials Research Society Symp. Proc.*, 361:257-26, 1995.

Figure 4:
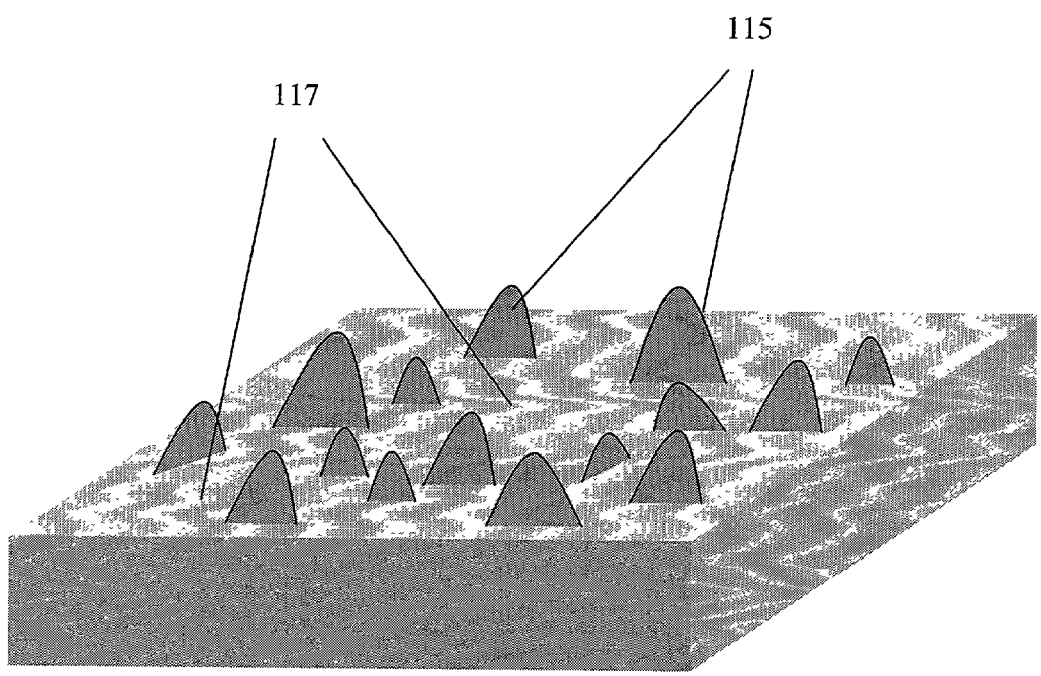
FIG. 4 depicts distribution of hillocks on an oxide substrate surface.

As shown in FIG. 4, the hillocks 115 typically have diameters in the range of 1 nm to 10 nm, and preferably in the range of 2 nm to 7 nm. The hillocks 115 typically are spaced at 1 nm to 100 nm from each other. Areas between the hillocks 115 are typically not covered by the catalyst particles after the annealing, and are therefore referred to as exposed areas 117. In one embodiment, hillocks 115 occupy about 50% of the surface area. In other words, the ratio between the area occupied by the hillocks 115 and the exposed area 117 is about 1:1.

Figure 5:
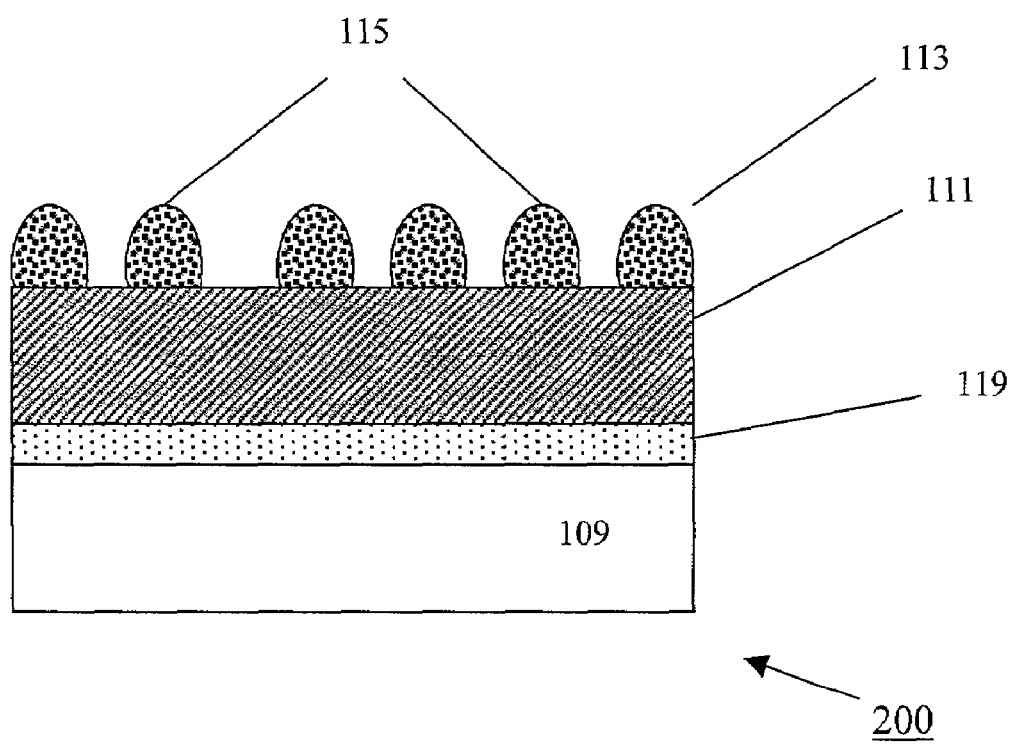
FIG. 5 depicts an embodiment of a hillock catalytic structure with an additional metal conductive layer.

FIG. 5 shows another embodiment, wherein the electrode material 109 is first coated with a thin layer 119 of conductive metal or alloy, such as titanium (Ti), chromium (Cr) or tantalum (Ta), followed with a thin layer of oxide 111 and a thin layer of catalyst 113. One advantage of this configuration (structure 200) is that the conductance of the structure 200 is greatly enhanced since electrons generated at the catalyst layer only have to pass through the lower conductive (higher resistance) oxide layer 111 to reach the conductive metal layer 119 where the electrons may easily go into the electrode material 109.

Figure 6:
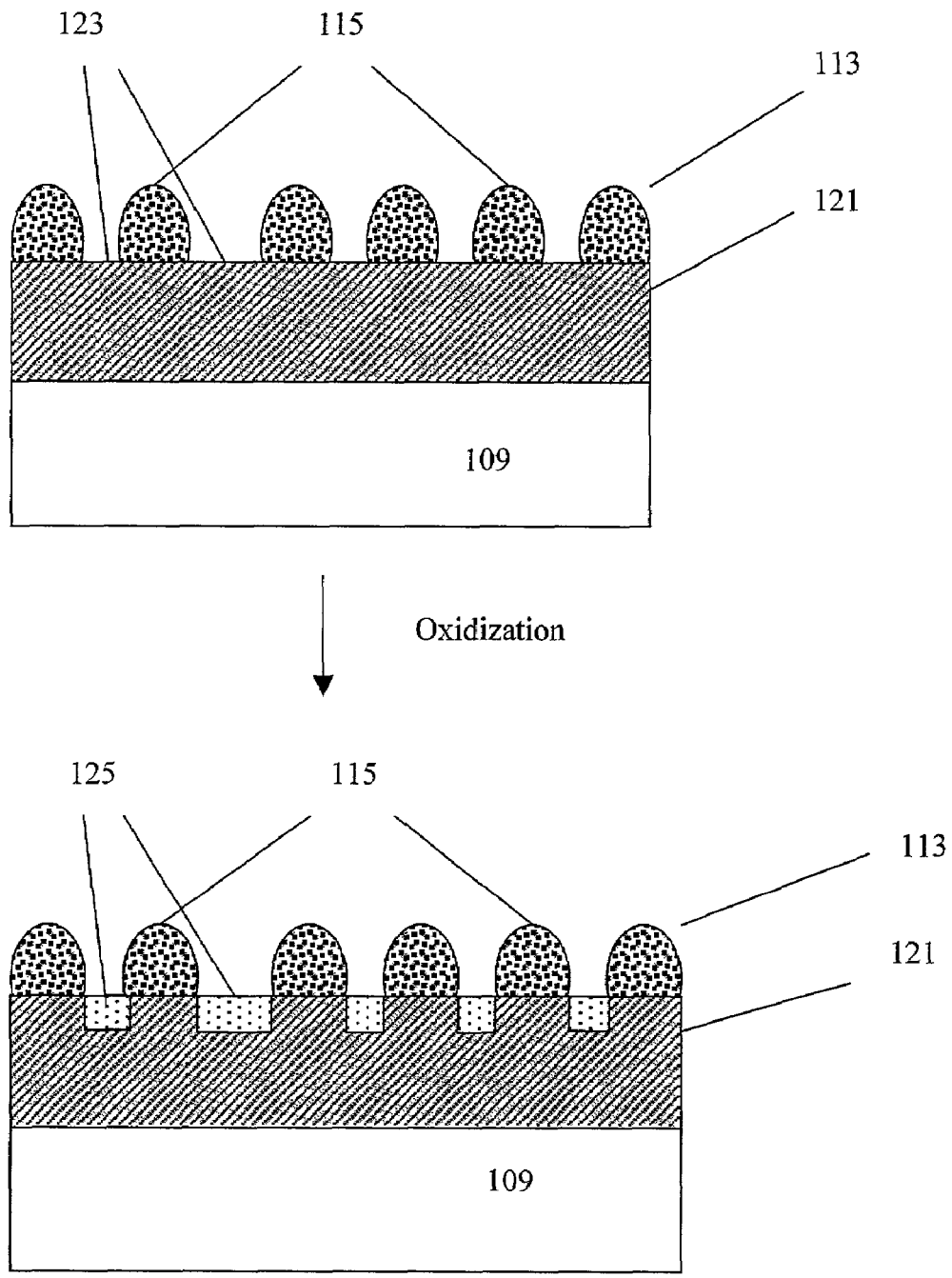
FIG. 6 depicts an embodiment of oxidizing surface $SiO_x$ in areas between hillocks.

In yet another embodiment shown in FIG. 6, the electrode material 109 is coated with a thin layer of $SiO_x$ 121 followed by a thin layer of catalyst 113. The catalyst layer 113 is then annealed to form the hillocks 115, while exposing $SiO_x$ 121 in areas 123 between the hillocks 115 (FIG. 6). The exposed area 123 can be further treated by a plasma oxidization process at elevated temperatures (e.g. 300-400° C.) to convert the exposed $SiO_x$ 121 to $SiO_2$ 125, which in turn enhances the reaction rate of catalyst 113. $SiO_x$ 121 covered by the catalyst hillocks 115, will not be oxidized and will remain conductive. It should also be noted that only the surface $SiO_x$ of the exposed area 123 is oxidized by the plasma process and that the $SiO_x$ below the surface of $SiO_2$ 125 remains unoxidized, so that the conductivity of the $SiO_x$ layer 121 is maintained after the oxidization process.

In a related embodiment, the electrode material 109 is coated with a non-oxide, metal based conductive material, followed by a thin layer of catalyst 113. The non-oxide, metal based conductive material is selected based on the criteria that the material would not interact with the catalyst during the subsequent high temperature annealing process, i.e., the non-oxide, metal based conductive material will not form an alloy with the catalyst or be involved in any chemical reaction with the catalyst during the annealing process so as to reduce catalyst activity. Examples of such materials include, but are not limited to, TiN, TiC, TaN, WC and stellite. The catalyst is annealed to form the hillocks 115. The hillock structure is then subjected to a plasma oxidization process at elevated temperatures (e.g. 300-400° C.) or an anodizing process to convert exposed non-oxide, metal based conductive material into corresponding metal oxide. Similar to the earlier embodiment, only the surface of the non-oxide, metal based conductive material is oxidized into the corresponding metal oxide. The non-oxide, metal based conductive material below the exposed surface remains unoxidized, so that the conductivity of the non-oxide, metal based conductive material layer is maintained after the oxidization process.

In one embodiment, the non-oxide, metal based conductive material is TiN. When the catalyst hillocks form on the TiN layer and the catalyst layer is converted into nano catalyst particles after annealing, some areas of the TiN layer are exposed (the areas between hillocks). Surface TiN in these exposed areas is then converted to $TiO_2$ by the plasma oxidization or anodization.

Although preferred embodiments and their advantages have been described in detail, various changes, substitutions and alterations can be made herein without departing from the spirit and scope of the catalytic structure as defined by the appended claims and their equivalents. These catalytic structures can be used in electrochemical devices, including fuel cells, batteries, sensors, electrolyzers and the like.

The invention claimed is:

1. A method, comprising:
    depositing a thin layer of conductive material onto an electrode material;
    depositing a layer of conductive oxide onto the thin layer of conductive material;
    depositing a thin film of catalyst onto the layer of conductive oxide, the thin film catalyst formed at least in part from a noble metal; and
    annealing the catalyst under such conditions that the thin film of catalyst forms hillocks, thereby forming an enhanced reactivity electrode.

2. The method of claim 1, wherein the electrode material is selected from a group consisting of porous metal, porous metal-ceramics, and carbon composite.

3. The method of claim 1, wherein the conductive oxide is selected from a group comprising $SiO_x$, $RuO_2$, $ZnO_2$, $SnO_2$, ZnInO and SrRuO, wherein 0<x<2.

4. The method of claim 3, wherein the conductive oxide is an oxygen deficient silicon oxide represented by the formula $SiO_x$, wherein 0<x<2.

5. The method of claim 4, wherein the conductive oxide is an oxygen deficient silicon oxide represented by the formula $SiO_x$, wherein 1<x<1.7.

6. The method of claim 4, wherein $SiO_x$ is deposited on the electrode material by reactive sputtering.

7. The method of claim 4, further comprising:
    subjecting the hillocks to an oxygen plasma process to oxidize a surface of exposed $SiO_x$ to $SiO_2$.

8. The method of claim 1, wherein the catalyst is a noble metal, an alloy of noble metals, or an alloy of noble and non-noble metals.

9. The method of claim 1, wherein the catalyst is deposited onto the conductive oxide by electron beam evaporation, sputtering, atomic layer deposition, or chemical vapor deposition.

10. The method of claim 1, wherein the conductive material is a metal or an alloy.

11. The method of claim 10, wherein the metal is titanium, chromium or tantalum.

12. The method of claim 1, wherein the conductive material is deposited onto the electrode material by electron beam evaporation, sputtering, atomic layer deposition, or chemical vapor deposition.

13. A method, comprising:
    depositing a layer of conductive oxide onto an electrode material;
    depositing a thin film of catalyst onto the layer of conductive oxide, the thin film of catalyst formed at least in part from a noble metal; and
    annealing the catalyst under such conditions that the thin film of catalyst forms hillocks, thereby forming an enhanced reactivity electrode.

14. The method of claim 13, wherein the conductive oxide is selected from a group comprising $SiO_x$, $RuO_2$, $ZnO_2$, $SnO_2$, ZnInO and SrRuO, wherein $0<x<2$.

15. The method of claim 14, wherein the conductive oxide is an oxygen deficient silicon oxide represented by the formula $SiO_x$, wherein $0<x<2$.

16. The method of claim 13, wherein the catalyst is a noble metal, an alloy of noble metals, or an alloy of noble and non-noble metals.

17. The method of claim 13, further comprising:
depositing a thin layer of conductive material onto the electrode material prior to the deposition of the conductive oxide.

18. A method, comprising:
depositing a layer of conductive oxide onto an electrode fabricated from a porous conductive material;
depositing a thin film of catalyst onto the layer of conductive oxide, the thin film of catalyst formed at least in part from a noble metal; and
annealing the catalyst under such conditions that the thin film of catalyst forms hillocks.

19. A method for enhancing catalyst reactivity in an electrochemical device, said method comprising:
depositing a layer of conductive oxide onto an electrode formed of an electrode material;
depositing a thin film of catalyst onto the layer of conductive oxide;
annealing the catalyst under such conditions that the thin film of catalyst forms hillocks, wherein formation of hillocks enhances catalyst reactivity; and
positioning the electrode, conductive oxide, and thin film catalyst forming hillocks within the electrochemical device.

20. The method of claim 19, wherein the electrode material is selected from a group consisting of porous metal, porous metal-ceramics, and carbon composite.

21. The method of claim 19, wherein the conductive oxide is selected from a group comprising $SiO_x$, $RuO_2$, $ZnO_2$, $SnO_2$, ZnInO and SrRuO, wherein $0<x<2$.

22. The method of claim 19, wherein the conductive oxide is an oxygen deficient silicon oxide represented by the formula $SiO_x$, wherein $0<x<2$.

23. The method of claim 19, wherein the conductive oxide is an oxygen deficient silicon oxide represented by the $SiO_x$, wherein $1<x<1.7$.

24. The method of claim 19, wherein the catalyst is a noble metal, an alloy of noble metals, or an alloy of noble and non-noble metals.

25. The method of claim 19, further comprising:
depositing a thin layer of conductive material onto the electrode material prior to the deposition of the conductive oxide.

26. The method of claim 19, wherein the conductive oxide is a metal or an alloy.

27. The method of 26, wherein the metal is titanium, chromium or tantalum.

28. The method of claim 19, wherein the conductive oxide is deposited onto the electrode material by electron beam evaporation, sputtering, atomic layer deposition, or chemical vapor deposition.

29. A method, comprising:
depositing a layer of conductive oxide onto a substrate;
depositing a thin film of catalyst onto the layer of conductive oxide, said thin film of catalyst formed at least in part from a noble metal; and
annealing the catalyst to form hillocks from the thin film of catalyst.

30. The method of claim 29, wherein the substrate is selected from a group consisting of porous metal, porous metal-ceramics, and carbon composite.

31. The method of claim 29, wherein the catalyst is a noble metal, an alloy of noble metals, or an alloy of noble and non-noble metals.

32. The method of claim 29, further comprising:
depositing a thin layer of conductive material onto the electrode material prior to the deposition of the conductive oxide.

33. The method of claim 1, further comprising employing the enhanced reactivity electrode in an electrochemical device.

34. The method of claim 13, further comprising incorporating the enhanced reactivity electrode within an electrochemical device.

35. The method of claim 18, further comprising employing the electrode, conductive oxide, and the thin film of catalyst forming hillocks within an electrochemical device.

36. The method of claim 29 wherein the conductive oxide and thin film of catalyst are subsequently employed within an electrochemical device.

37. A method of forming a device, comprising:
depositing a layer of conductive oxide directly onto a substrate;
depositing a thin film of catalyst directly onto the layer of conductive oxide, said thin film of catalyst formed at least in part from a noble metal; and
annealing the catalyst to form hillocks from the thin film of catalyst.

38. The method of claim 1 wherein the hillocks are exposed.

* * * * *

UNITED STATES PATENT AND TRADEMARK OFFICE
CERTIFICATE OF CORRECTION

| | | |
|---|---|---|
| PATENT NO. | : 7,361,426 B2 | Page 1 of 1 |
| APPLICATION NO. | : 10/118928 | |
| DATED | : April 22, 2008 | |
| INVENTOR(S) | : Alfred I-Tsung Pan | |

It is certified that error appears in the above-identified patent and that said Letters Patent is hereby corrected as shown below:

In column 3, line 22, delete "150 mn" and insert -- 150 nm --, therefor.

In column 4, line 18, after "electrode material" insert -- 109 --.

In column 4, line 23, delete "ZnlnO" and insert -- ZnInO --, therefor.

In column 6, line 21, in Claim 1, after "film" insert -- of --.

In column 6, line 31, in Claim 3, delete "ZnlnO" and insert -- ZnInO --, therefor.

In column 7, line 31, in Claim 19, after "film" insert -- of --.

In column 7, line 44, in Claim 23, after "the" insert -- formula --.

Signed and Sealed this

Seventh Day of April, 2009

JOHN DOLL
*Acting Director of the United States Patent and Trademark Office*